E. J. BROOKS.
SNAP SEAL.
APPLICATION FILED SEPT. 15, 1909.
942,774.
Patented Dec. 7, 1909.
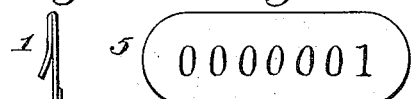
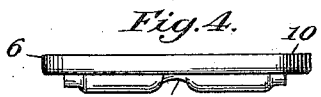
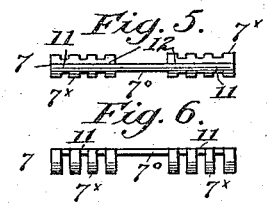
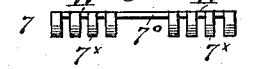
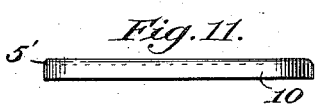
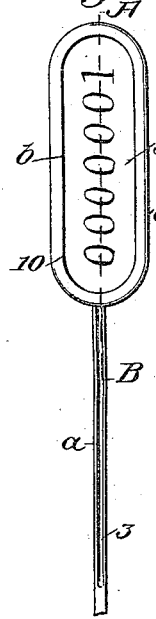
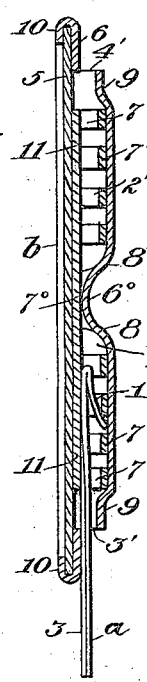
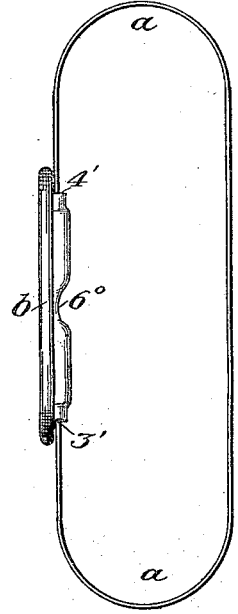
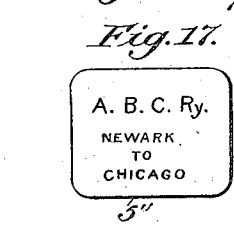
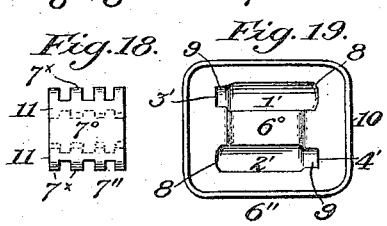
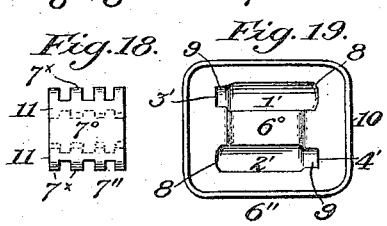
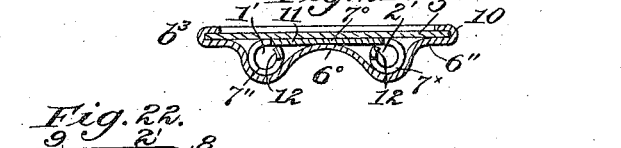
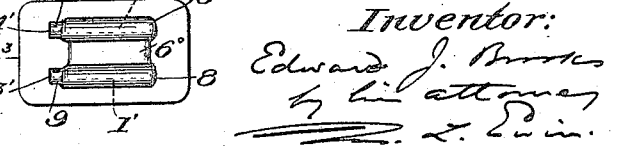
Witnesses:
Inventor:
Edward J. Brooks

UNITED STATES PATENT OFFICE.

EDWARD J. BROOKS, OF EAST ORANGE, NEW JERSEY.

SNAP-SEAL.

942,774. Specification of Letters Patent. Patented Dec. 7, 1909.

Application filed September 15, 1909. Serial No. 517,857.

*To all whom it may concern:*

Be it known that I, EDWARD J. BROOKS, a citizen of the United States of America, and a resident of East Orange, in the State of New Jersey, have invented a new and useful Improvement in Snap-Seals, of which the following is a specification.

This invention relates, in common with previous improvements, to self-fastening seals, or "snap seals" as they are commonly termed, for use, as substitutes for lead and wire seals and other press-fastened or press-fastenable sealing devices, to secure the doors of railway freight cars and for other like purposes.

The present invention is additional, more particularly, to that improvement in snap seals set forth in my previous specification forming part of United States Letters Patent No. 524974 dated August 21, 1894, characterized by a hollow seal part having within it a substantially tubular catch device, in the form of an open coil, to interact with a resilient terminal hook on one or each of the shackle ends, and to afford successive holds for the same.

The present invention also relates particularly to those snap seals in which the flexible shackle is of flat wire provided with snap catches in the form of resilient terminal hooks. Examples of such shackles are set forth in my specification forming part of United States Letters Patent No. 912534 dated February 16, 1909, and previous specifications therein referred to.

This invention consists in certain novel combinations of parts including a seal part inclosing one or a pair of open coils, or a preferred substitute therefor operating on the same principle, and a flexible shackle of flat wire having a resilient terminal hook at one or each of its ends to intersect therewith, and in snap seals embodying such combinations or any of them, as hereinafter described and claimed.

The leading object of this invention is to embody such successive-hold and resilient-hook fastening devices within snap seals having substantially flat seal parts constructed of sheet metal, with or without supplemental labels of paper or the like.

Another object is to provide such seals with a superior substitute for the wire coils set forth in said previous specification of Letters Patent No. 524974.

Other objects will be set forth in the general description which follows.

A sheet of drawings accompanies this specification as part thereof.

Figure 1 is an edge view of the flat-wire shackle of the improved seals, showing a preferred construction; Figs. 2 to 6 inclusive are detail views of the three members of the first species of the seal part, as they appear before being assembled; Fig. 7 represents a face view of the improved seal as constructed with said first species of the seal part, showing the latter as it leaves the factory; Fig. 8 represents a magnified longitudinal section on the line A—B, Fig. 7; Fig. 9 is an edge view of the same species, showing the seal with both shackle ends snap fastened; Figs. 10 to 15 inclusive are detail views of the several members of a second species of the seal part, as they appear before being assembled; Fig. 16 represents a magnified longitudinal section through the completed seal part of said second species; Figs. 17, 18, and 19 represent face views of the members of a third species of seal part, embodying the same invention, as they appear before being assembled; Fig. 20 represents a magnified longitudinal section through the seal part of said third species; Fig. 21 represents a cross section of the same on the same scale as Fig. 20; and Fig. 22 is a back view illustrating a modification of said third species.

Like reference characters refer to like parts in all the figures.

Each of the improved snap seals is composed of a flexible flat-wire shackle, *a*, and a substantially flat sheet-metal seal part, *b* or $b^2$ or $b^3$. The common shackle *a*, shown detached by Fig. 1, is characterized by resilient terminal hooks, 1 and 2, at both extremities; and adjoining portions of both ends are preferably provided with stiffening ribs, 3 and 4, which may also serve as "inlet guards" to obstruct the inlets of the interacting seal part. As shown, the ribs 3 and 4 are hollow at the face of the shackle. See Fig. 8.

Each of the seal parts, *b*, $b^2$ and $b^3$, has a pair of hook-admitting passages, 1′, 2′, with inlets, 3′ and 4′, at opposite ends of the seal part, except in the modification represented by Fig. 22, and includes front and back members, 5 and 6, 5′ 6′, or 5″ 6″, of sheet metal, of which the back member 6 or 6′ or 6″ is stamped with tunnel-shaped projections on its back, forming said passages and inlets, and with a depression, 6°, connecting them. Compare Figs. 3—4, 12—13 and 19 with Figs. 8, 16 and 21, respectively. Each of the seal parts $b$, $b^2$, $b^3$ further includes a catch device, 7 or 7′ or 7″, forming successive holds for the respective shackle hooks 1 and 2 by means of a pair of substantially tubular hook-inclosing members having partly detached circumferential or latitudinal portions, $7^x$, one of which interacts effectively with the extremity of the corresponding hook, 1 or 2, and a substantially rigid portion, 7°, connecting the two tubular members in the plane of the front of the catch device. In each species of the seal part, each of said tunnel-shaped projections forming the hook-admitting passages 1′ 2′ and inlets 3′ 4′ is further constructed with a substantially closed inner end, 8, and with a contraction, 9, at or near its inlet end, to interact as stops with the ends of said tubular members of the catch device 7, 7′ or 7″.

In the seal part $b$ of the first species, represented by Figs. 2 to 9, inclusive, the front member, 5, is an oblong flat planchet with rounded ends; the back member, 6, fitted thereto, is stamped with a crown flange or seam-forming rim, 10, to overlap the edges of the front member, with said tunnel-shaped projections arranged longitudinally in line with each other, with their inlet ends 3′ and 4′ outermost and with the connecting depression 6° in line therewith; and the catch device, 7, is of the construction characterizing said preferred substitute for coils of wire, that is to say, it is formed of sheet metal, in one piece, with said connecting portion 7° in line with longitudinal portions, 11, from which the latitudinal portions $7^x$ extend to longitudinal portions, 12, which are parallel with said longitudinal portions 11 and adjoin the same when the catch device is bent to form its substantially tubular members. Compare Figs. 5 and 6 with Fig. 8.

In the seal part $b^2$ of the second species, represented by Figs. 10 to 16, inclusive, the front member 5′ is provided with the seam-forming rim 10, and the rim of the back member 6′ is flat. Otherwise these members are or may be identical with the corresponding members 5 and 6 of the first species. The catch device 7′ of the second species is made of wire with open coils to form its latitudinal portions, $7^x$; the connecting portion 7° being formed at midlength of the wire by suitable bends.

In the third species, represented by Figs. 17 to 21, inclusive, the construction is substantially identical with that of the first species, except that the hook-admitting passages 1′ and 2′ are arranged side by side, with the connecting depression, 6°, at right angles thereto, as best shown in Fig. 19, and the catch device 7″ is correspondingly constructed with its connecting portion 7° adjoining or taking the place of said longitudinal portions 11 of the tubular members.

The one-piece sheet-metal catch device in either of its forms (7 and 7″) is superior to the catch device 7′ of coiled wire in two particulars: Its longitudinal portions (11) with which its connecting portion 7° unites, form smooth lengthwise surfaces within the tubular members, to interact with the backs of the shackle hooks 1 and 2; and, in assembling the parts, catch members of this construction are not liable to interlock with each other or become tangled in the box or keg, and can consequently be more quickly handled. For these reasons this construction of the catch device is preferred, and is selected as the basis of my specific claims.

In the modification illustrated by Fig. 22 the seal part $b^3$ of the third species has the inlet 3′ and 4′ of its passage-forming projections at one and the same end.

In each of the species, the shackle and seal part will ordinarily be united at the factory at one of the shackle ends as illustrated by Figs. 7 and 8, and for some of the purposes of this invention that end and its accessories may be of any known or improved construction. In all the species the seal part is finally snap-fastened so that the seal part unites the ends of the shackle as illustrated by Fig. 9, or so that the seal part interacts with the shackle in an equivalent way to prevent opening the car door or the like to which the seal is applied.

The first of the front members 5, 5′ and 5″ is shown in Figs. 2 and 7 as provided with a serial number represented by "0000001"; the second one, Fig. 10, blank for the reception of the impression of a rubber stamp or the like, and the third one, Fig. 17, with descriptive lettering represented by "A, B, C, Ry. Newark to Chicago". It will be understood that in either species said front member may be blank, or provided with any desired lettering, or distinguishing marks of any character, or a supplemental label of waterproof paper or the like may be superadded if desired; and other like modifications will suggest themselves to those skilled in the art.

Having thus described said improvement, I claim as my invention, and desire to patent under this specification:

1. The combination, in a snap seal of a flexible shackle of flat wire and a substantially flat seal part of sheet metal, united at one of the shackle ends, said shackle having at its other end a resilient terminal hook and said seal-part comprising a member provided on its back with a tunnel-shaped projection forming an inlet and passage constructed to admit said hook, a seal-part member covering the front of the member first named, and a substantially tubular catch member within said passage constructed with partly detached latitudinal portions forming successive holds for the hook within it.

2. The combination, in a snap seal, of a flexible shackle of flat wire and a substantially flat seal part of sheet metal, united at one of the shackle ends, said shackle having at its other end a resilient terminal hook, and said seal-part comprising a member provided on its back with a tunnel-shaped projection forming an inlet and passage constructed to admit said hook and having a contracted inlet end and a closed inner end, a seal-part member covering the front of the member first named, and a substantially tubular catch member within said passage held in place between said inner end and said contracted inlet end and constructed with partly detached latitudinal portions forming successive holds for the hook within it.

3. In combination with a flexible flat-wire shackle having a resilient terminal hook at each end, a substantially flat sheet-metal seal-part member provided on its back with a pair of tunnel-shaped projections forming an inlet and passage for each shackle end, a seal-part member covering the front of the member first named, and a catch device having a pair of substantially tubular members forming successive holds for the respective hooks within the respective passages and a portion connecting said tubular members.

4. In combination with a flexible flat-wire shackle having a resilient terminal hook at each end, a substantially flat sheet-metal seal-part member provided on its back with a pair of tunnel-shaped projections forming an inlet passage for each shackle end, and a seal-part member covering the front of the member first named, a catch device of sheet metal in one piece including a pair of substantially tubular members constructed with longitudinal portions and with partly detached latitudinal portions forming successive holds for the respective hooks within the respective passages and a portion connecting said longitudinal portions of the respective tubular members, substantially as hereinbefore specified.

EDWARD J. BROOKS.

Witnesses:
 EDWARD E. CHASE,
 FRANZ M. SIMMONS.